L. REASER.
AUTOMOBILE SIGNAL DEVICE.
APPLICATION FILED JAN. 21, 1922.

1,413,237.  Patented Apr. 18, 1922.

Lewis Reaser, Inventor

UNITED STATES PATENT OFFICE.

LEWIS REASER, OF READING, PENNSYLVANIA.

AUTOMOBILE SIGNAL DEVICE.

1,413,237.  Specification of Letters Patent.  Patented Apr. 18, 1922.

Application filed January 21, 1922. Serial No. 530,769.

*To all whom it may concern:*

Be it known that I, LEWIS REASER, a citizen of the United States, residing at Reading, in the county of Berks and State of Pennsylvania, have invented certain new and useful Improvements in Automobile Signal Devices, of which the following is a specification.

This invention relates to improvements in automobile signal devices, and the object is to provide a device that will serve as a signal to a following vehicle, and as a direction indicator to the traffic officer or the approaching vehicle.

The invention consists of a signal arm and direction indicator combined, mounted for arcuate action on one of the vertical uprights of the vehicle, and provided with a hand actuated lever, whereby, when the driver of the vehicle intends to change his course to either right or left, the lever is actuated, either on the right or left hand side of the car, and the signal arm and direction indicator is thrown out to a horizontal position, indicating that the driver intends to follow the direction thus indicated.

It is evident that the signal arm may if preferred, carry a light, which may be attached to the battery with which all such vehicles are provided with. The blade of the signal arm may be either painted or it may carry a small flag.

The invention is fully described in the following specification and clearly illustrated in the accompanying drawing if which:—

Figure 1:
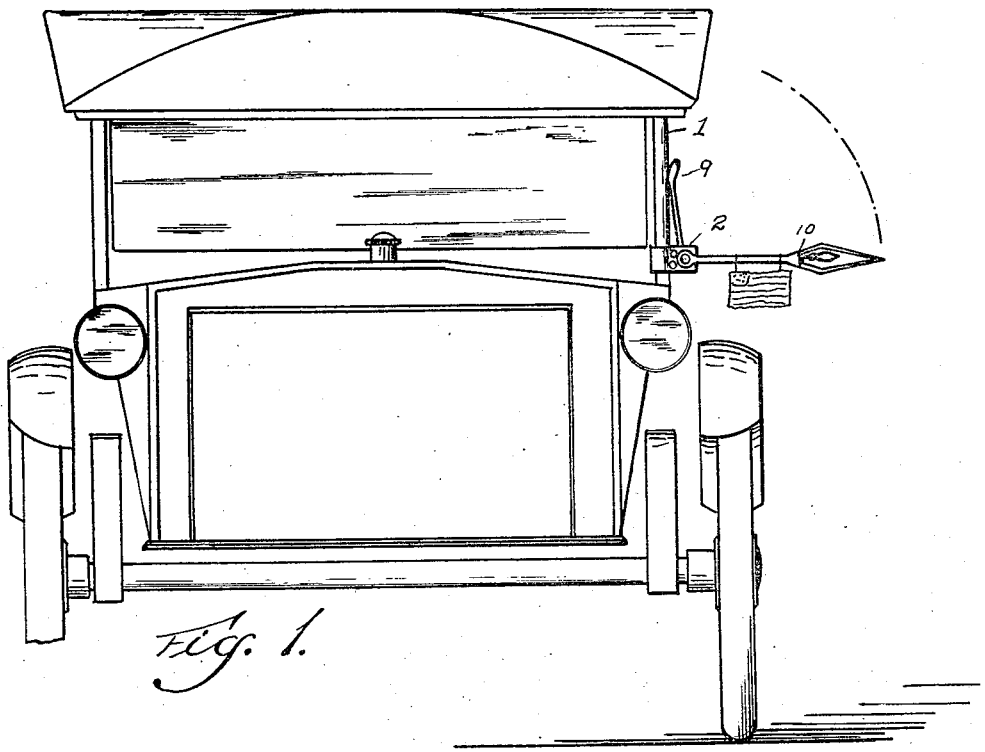
Figure 1 represents the front elevational view of an ordinary automobile, with my improved device attached thereto, at one side, and showing in horizontal position.
Figure 2:
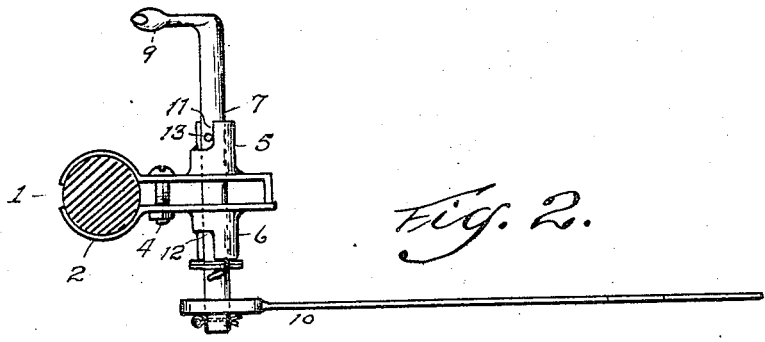
Figure 2 is a sectional view through the vehicle upright, and the clamping member of the device, showing the stop for the signal arm throw.

The numeral 1 designated the front vertical upright member of a vehicle, to which my device is to be attached, one at either side of the vehicle, although I have shown only one in position. The numeral 2 designates a clamping member by means of which the device is attached to the upright. This clamp member is formed of two parts, adapted to embrace the post 1, but with the inner ends not quite meeting, while the outer ends are provided with means for securing them together, such as a bolt and nut 4. These outer members are each provided with a hub 5 and 6 respectively, through which a rod 7 passes and in which it is adapted to turn. This rod 7 is the actuating rod for the signal arm operation, and it is provided at one extremity with a hand lever portion 9, while the other extremity carries the signal arm and direction indicator, indicated by the numeral 10.

The hubs 5 and 6, as stated, are formed with slots 11 and 12, and these are in turn adapted to limit the movement of the rod in its arcuate movement, through the medium of pins 13 which engage the said slots.

It is evident that the clamp members, being arranged in two parts, and with the particular manner of securing them, may easily be adjusted to uprights of different sizes, and that the signal arm may also be adjusted on the operating rod if desired.

When the driver intends to change his direction of travel, he merely actuates one of the hand levers, depending on which direction he intends to take, and the signal arm at once indicates not only that the direction is to be changed, but the exact direction to be taken.

It is possible also to attach both arms to the one lever, centrally located, so that either arm may be operated through the single lever, by moving it in opposite directions.

The device is extremely simple in structure and cheap in cost of construction, being stamped from sheet metal.

Having thus described my invention, what I claim and desire to secure by Letters Patent is:—

1. In a combined signal device and direction indicator for automobiles, the combination of a vertical vehicle member, with a two-part clamp device attached thereto, said clamp having hubs formed on each part, one of said hubs having a slot to act as a limit stop, a rod mounted for rotary movement in said hubs, an operating handle carried by one end of the rod and a signal arm and direction indicator carried by the other end of the rod, and a pin on the rod to limit the movement of the rod in the hubs.

2. In a device of the character described, a two part clamp member, adapted for engagement with a vehicle upright, said clamp being formed of two plates, each of which is provided with a hub, means for clamping the plates together to engage the upright, a rod mounted in the hubs and adapted to rotate therein, a pin carried by the rod and adapted to limit the movement of the rod, a handle on one end of the rod and a direction indicator on the other end.

In testimony whereof I affix my signature.

LEWIS REASER.